Feb. 16, 1932.  W. C. STARKEY  1,845,684
ANTIREVERSE SAFETY CLUTCH
Filed Aug. 31, 1929
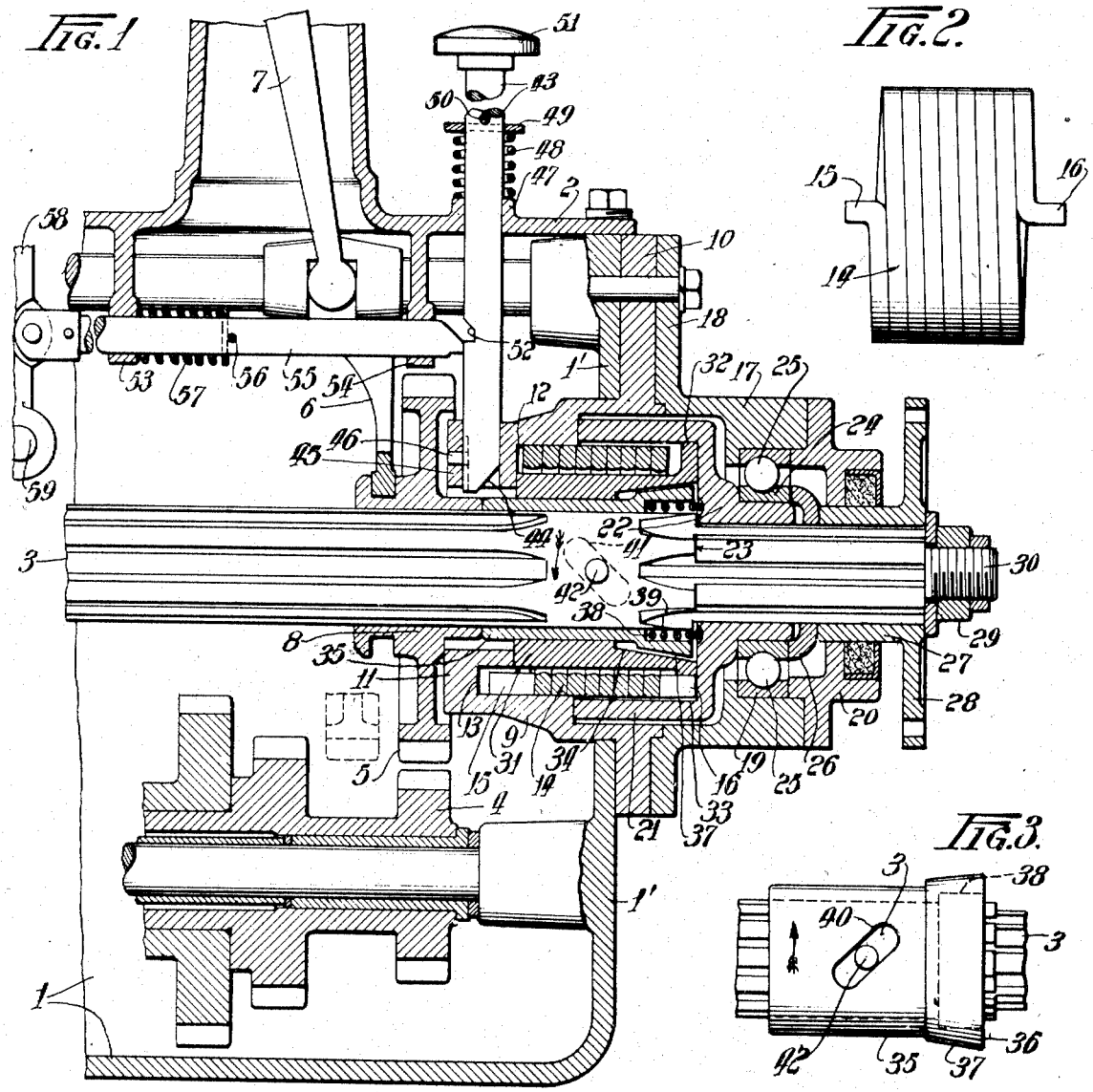
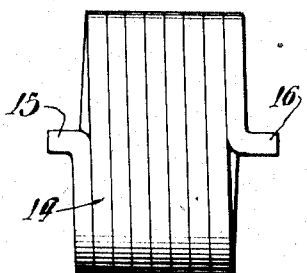
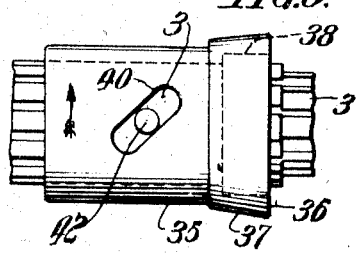
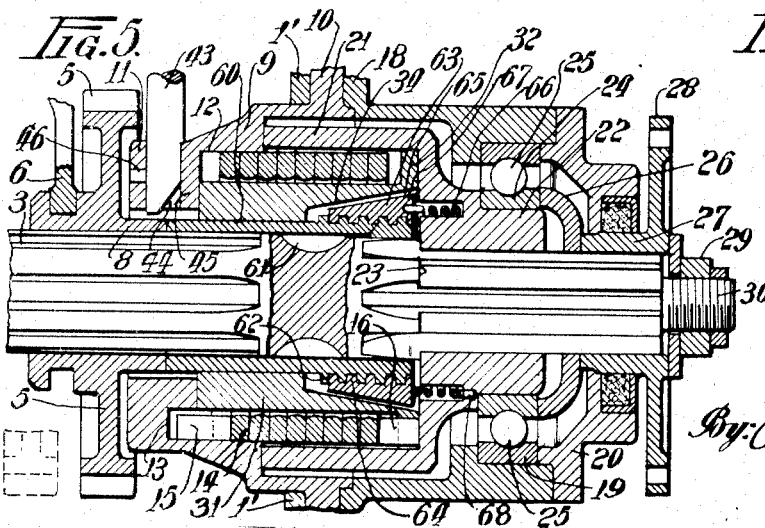
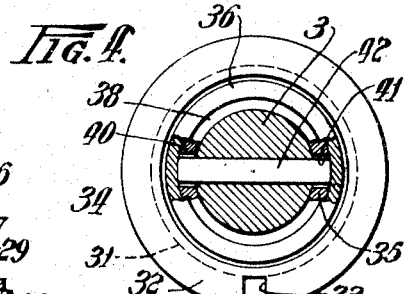
Inventor:
W. C. Starkey,
Atty.

Patented Feb. 16, 1932

1,845,684

UNITED STATES PATENT OFFICE

WILLIAM CARLETON STARKEY, OF INDIANAPOLIS, INDIANA, ASSIGNOR TO L. G. S. DEVICES CORPORATION, OF INDIANAPOLIS, INDIANA, A CORPORATION OF INDIANA

ANTIREVERSE SAFETY CLUTCH

Application filed August 31, 1929. Serial No. 389,723.

This invention relates to the automatic prevention of reverse movement of a rotary shaft usually driven in one direction, the invention having reference more particularly to means adapted to automatically act and prevent the reverse movement of a driven shaft but permitting intentional reverse movement.

An object of the invention is to provide an anti-reverse safety clutch or back stop that will automatically act reliably, to prevent backward motion of a motor-vehicle equipped therewith at all times except when backward motion is intended by the motor-vehicle operator.

Another object is to provide an anti-reverse clutch mechanism of such construction as to require only slight effort at all times for control thereof to engage or release, and one that will not bind or jam under the most severe operating conditions.

A further object is to provide an anti-reverse safety clutch mechanism that shall be of such construction as to not require any special skill or training in the manipulation or care thereof, beyond that needed for the operation of an ordinary motor-vehicle.

A further object is to provide a mechanism for motor-vehicles that shall be adapted to prevent backward motion of a motor-vehicle immediately when the operator thereof shifts the transmission gears out of reverse position.

A further object is to provide a back stop mechanism with a manually operated releasing device that can be put into use only when the motor-vehicle transmission gears are in the neutral position, and is automatically withdrawn when the gears are shifted into any forward speed position.

A still further object is to provide an improved back stop mechanism for motor-vehicles which shall be of simple and sturdy construction yet not costly, which shall be adapted to operate smoothly and silently and be readily adaptable to transmission apparatus as commonly constructed.

With the above-mentioned and other objects in view, the invention consists in novel clutching mechanism and novel controlling apparatus therefor, enabling the mechanism automatically to stop unintentional reverse movement of a shaft, and novel controlling means operable to permit reverse movement of the shaft; and further, the invention consists in the novel parts, and in the combinations and arrangements of parts, as hereinafter particularly described and further defined in the claims appended hereto.

Referring to the accompanying drawings, Figure 1 is a longitudinal vertical central section of the anti-reverse apparatus in connection with a typical motor-vehicle motion transmission set fragmentarily illustrated; Fig. 2 is a side view of a coil spring clutch comprised in the invention as preferably constructed; Fig. 3 is a side view of an improved element of the invention as preferably constructed in connection with the transmission shaft of a motor-vehicle; Fig. 4 is a transverse section of the transmission shaft and clutch device assembled thereon; and Fig. 5 is a longitudinal central section of the anti-reverse clutch mechanism slightly modified.

Similar reference characters in the various figures of the drawings indicate corresponding elements or features of construction herein referred to in detail.

The construction of the invention, although not limited to use in motor-vehicles, is advantageously applied thereto; and in order that the invention and its functions may most readily be understood the construction is shown in connection with a well-known type of speed changing transmission gearing, only a portion of the latter sufficient to an understanding of the invention being shown. The transmission gearing includes a casing comprising a body portion 1 and head portion 1', the casing having a removable cover 2, a transmission or drive shaft 3 extending through the casing, a reverse gear 4 with other speed changing gears being rotatively supported in the casing, a shiftable gear wheel 5 splined on the shaft and adjustable thereon by means of a shifter fork 6 and a lever or rod 7, the gear wheel 5 being moved towards the head portion 1' of the casing to be connected through an idler gear (not shown) with the wheel 4 to cause reverse motion of the drive shaft for propelling the motor-vehicle backwards. Preferably the wheel 5 has a hub extension 8 on the side thereof that faces the head portion 1' of the casing.

As preferably constructed the invention comprises an annular head box 9 that is arranged in a suitable opening in the head portion 1' of the casing and has a flange 10 that is secured thereto, the box having a bottom 11 bored to a larger diameter than that of the hub extension 8, the box having a counterbore 12 and a pocket 13 at the bottom of the counter-bore, the latter receiving one end portion of a coil spring clutch 14 having a lug 15 on its inner end that is anchored in the pocket, the opposite end of the clutch having also a lug 16 thereon. The front portion of the box is diametrically larger than the spring clutch. The box 9 has a front part 17 provided with a flange 18 that is secured to the flange 10, so that the box and the front part thereof constitute an incasing housing, the front part 17 supporting a bearing ring 19 which is held therein by a cap member 20 suitably secured to the front part. An annular clutch member 21 is provided and arranged in the box and its front part is bored to a diameter only slightly greater than that of the clutch 14, a portion of the clutch being received within the clutch member for engagement therewith upon slight unwinding movement of the clutch spring, the clutch member having a hub 22 that is secured on a small portion of the shaft 3 against a shoulder 23 at the end of the larger portion of the shaft. A bearing member 24 is arranged on the hub 22 and rotatably supported by bearing balls 25 supported in the ring 19. Preferably the member 24 is secured in place by means of a collar 26 forced against the member by the hub 27 of a shaft coupling flange 28 and a nut 29 screwed onto a stud portion 30 provided on the end of the shaft.

The spring clutch 14 is provided with a controller comprising a collar 31 of suitable diameter to be loosely received within the clutch with its inner end at the bottom of the box 9, being bored to a diameter greater than that of the drive shaft and having a flange 32 on its outer end provided with a slot or pocket 33 receiving the lug 16 of the clutch, the flange preferably being guided by the clutch member 21 and its hub portion 22. The controller has an inclined clutch face 34 in its outer end portion adapted to be engaged by a conical clutch member.

For the operation of the collar and thereby the spring clutch, a sleeve 35 is provided which is fitted closely into the collar and onto the drive shaft and it has a relatively large head portion 36 provided externally with an inclined clutch face 37 which is conical to operate in connection with the clutch face 34. The head portion has a counter-bore 38 therein receiving a coil spring 39 that is supported by the hub 22 for constantly tending to move the conical clutch into connection with the internal clutch face 34. The wall of the sleeve has oppositely pitched cam slots 40 and 41 in opposite portions thereof that receive end portions respectively of a pin 42 that is set transversely in the drive shaft, to provide rapid cam-like or screw-action to quickly move the sleeve longitudinally by rotary movement of the shaft.

In order to release the safety clutch to permit a motor-vehicle to be manually pushed backward when parked or in a garage, a releaser bar 43 is provided which is suitably arranged in the casing and has a beveled end 44 to operate against the back end of the sleeve 35, being suitably supported in a guideway 45 provided in the bottom 11 which preferably has a pin 46 set therein and extending into a groove in one side of the bar to limit the downward movement of the bar. The bar preferably is guided also in a boss 47 provided on the cover 2 of the casing, a spring 48 being supported upon the boss, there being a washer 49 arranged upon the spring and a pin 50 set into the bar and resting upon the washer, so that the release bar is automatically retracted. The bar may be operated by suitable means, as by a knob 51 arranged upon its top. One side of the bar preferably has a notch 52 adapted to receive a latch bolt which may be supported in bearings 53 and 54 arranged in the casing, preferably being in the form of a horizontal rod 55 having a pin 56 fixed thereto that is engaged by a spring 57 seated on the bearing 53 to project the rod into the notch 52, the rod being retractible by suitable means, as by a lever 58 supported on a pivot 59 suitably arranged.

In Fig. 5 the structure illustrated is mainly similar to that above described but shows one of the modified forms of appliance that may be adopted for clutching the collar 31 substantially to the drive shaft so as to operate the main clutch 14, the collar being substantially as above described with respect to its clutch face. A sleeve 60 is arranged on the shaft and rotated thereby by suitable splines 61 permitting longitudinal movement on the shaft, the sleeve having a steep pitch screw thread 62 thereon. A floating clutch member 63 is arranged on the sleeve and has a screw thread 64 therein in engagement with the thread 62. The clutch member is conical and has a clutch face 65 to co-act with the face 34. A torsion and compression spring 66 is arranged in a suitable cavity in the hub 22 to contact with the clutch element 63 and has a lug 67 on one end that is entered in a suitable pocket in the clutch element, the spring having also a lug 68 on its opposite end anchored in the bottom of the cavity, the spring impelling the clutch element towards the clutch face in the collar. Upon operation of the bar 43 if the wheel 5 is in neutral position the sleeve is slightly moved longitudinally to disengage the sleeve from the collar.

In practical use the transmission or drive shaft rotates in the direction indicated by the arrow on the shaft in Fig. 1 to impart forward motion of a motor-vehicle, the gear wheel 5 being shifted out of contact with the controlling sleeve which is prevented by the controlling device from being clutched to the collar 31, permitting contraction and inaction of the main clutch 14, the impelling spring consequently being slightly compressed and its force overcome; when the motor-vehicle and the transmission shaft stops, if the motor-vehicle starts backward so that the transmission shaft begins to turn in the reverse direction indicated by the arrow on the sleeve in Fig. 3, the clutch element on the sleeve being clutched to the collar with sufficient force to tend to prevent rotation of the clutch element, the controlling device provided immediately causes tightening of the clutching engagement which insures slight rotary movement of the collar so as to cause unwinding action of the spring clutch 14 and consequent expansion thereof into effective clutching engagement thereof with the clutch member 21, resulting in immediate stoppage of reverse movement of the motor-vehicle.

When the gear wheel 5 is shifted to reverse position with the intention of driving the motor-vehicle backwards the hub 8 is moved into contact with the controlling sleeve which results in unclutching action permitting the desired reverse movement. After stoppage of the backward movement of a motor-vehicle accompanied by shifting of the gear wheel to neutral position, the anti-reverse mechanism being free to act, it follows that the backward movement is immediately arrested and would prevent pushing of the motor-vehicle backward when parked or in a garage, but such backward movement may be permitted by operating the bar 43 to force the controlling sleeve on the shaft sufficiently to unclutch the shaft from the housing, the bar becoming automatically latched by the latch bolt 55. This permits traffic officers or others to manually push the motor-vehicle to other positions than that in which it may have been left by its operator. When it is intended to operate the motor-vehicle as usual the latch bolt is withdrawn by movement of the lever 58 which obviously may be connected or arranged to be operated automatically to unlatch the bar 43 upon operation of a starter device or gear shifter as may be preferred.

What is claimed is:

1. Anti-reverse mechanism having a rotary drive shaft, an annular clutch member fixed to the shaft, an operable main friction clutch device to co-act with the clutch member, and controllable friction clutch means movable longitudinally of and automatically controlled by the drive shaft to operate the main clutch device, the main clutch device and the controllable friction clutch means being arranged intermediately of the drive shaft and the clutch member.

2. Anti-reverse mechanism having a rotary drive shaft and a clutch member fixed thereto, a main friction clutch device having an anchorage and operable to co-act with the clutch member for arresting reverse movement of the shaft, a noiseless friction clutch actuating means to operate the clutch device and provided with an automatic impelling device and which friction clutch actuating means is longitudinally movable with respect to said drive shaft, and controlling means for the actuating means controlled by the drive shaft to operate in synchronism with the impelling device.

3. Anti-reverse mechanism including a rotary transmission shaft, a housing supporting the shaft, a clutch member having a hub fixed to the shaft, a collar guided by the housing and a portion of the clutch member and having a clutch face, a coil spring clutch connected to the housing and to the collar, a friction clutch element to co-act with said clutch face and provided with a sleeve supported on the shaft to control the clutch element, a compression spring having impelling connection with the clutch element, and a device enabling the shaft to control the sleeve.

4. Anti-reverse mechanism including a housing, a transmission shaft rotatably supported in the housing, an annular clutch member having a hub fixed to the shaft, a collar guided by the housing and said hub and having an inclined clutch face therein, a coil spring clutch device operatively engaged at one end with the housing and connected at its opposite end to the collar to be operated for engagement with the clutch member, a sleeve splined to the shaft and provided with a clutch element to co-act with the clutch face of the collar, and a releasing bar movably supported by the housing to engage and move the sleeve and thereby disengage said clutch element from said clutch face.

5. In anti-reverse mechanism, the combination of a housing, a rotary transmission shaft driven by power at one end thereof, main friction clutch apparatus having constant connection with the housing and operable to clutch a permanent member of the shaft to the housing, and inner and outer friction clutch sleeves on the shaft and one of which is actuated thereby to operate the main clutch apparatus upon reverse movement of the shaft.

6. In anti-reverse mechanism, the combination, with a housing and a rotary transmission shaft therein, of an operable main friction clutch apparatus to lock the shaft to the housing, controlling friction clutch mechanism for the main clutch apparatus including a friction clutch sleeve slightly movable longitudinally on the shaft to unclutch and release the main clutch apparatus, a spring-retracted releasing device supported by the housing and engageable with the sleeve to forcibly move the sleeve, and a retractible latch bolt supported also by the housing and constantly impelled towards the releasing device to engage and hold the same operatively.

7. In anti-reverse mechanism, the combination, with a housing and a rotary transmission shaft therein, of an annular clutch member having a hub fixed to the shaft, a sleeve on the shaft having at one end a clutch element and slightly movable longitudinally on the shaft to control the clutch element, a collar rotatable on the sleeve and having a clutch face to be engaged by said clutch element, a coil spring clutch device to co-act with the clutch member surrounding the collar and connected at one end thereto, the opposite end of the clutch device being anchored to the housing, a compression spring arranged between said sleeve and said hub to impel said sleeve to action, and a controlled gear wheel having a hub on the shaft movable to contact with the opposite end of the sleeve for retracting said sleeve from clutching engagement with the collar.

8. In anti-reverse mechanism, the combination with a housing, of a shaft rotatable in the housing and having a cross pin therein to project beyond the shaft, a sleeve loose on the shaft and having a thread-pitched slot in the wall thereof receiving a portion of said pin, the sleeve being provided with a spring-impelled friction clutch element, a coil spring clutch device anchored at one end to the housing, a clutch member having fixed connection with the shaft to be engaged by the clutch device, and friction clutch means to connect the opposite end of the clutch device with said clutch element upon actuation of said element.

9. In anti-reverse mechanism, the combination, with a rotary transmission shaft and a housing therefor, of an annular clutch member having a hub fixed to the shaft, a coil spring clutch device loose in the clutch member and secured at one end to the housing, operative friction clutch apparatus having operative connection with the opposite end of the clutch device, controlling means for said clutch apparatus including a sleeve longitudinally movable on and controlled by the shaft to operate said clutch apparatus, and retractible releasing means supported by the housing and movable in a plane at a right angle to said sleeve for engaging and forcibly moving the sleeve to temporarily prevent action of the friction clutch apparatus.

10. In anti-reverse mechanism, the combination, with a rotary transmission shaft and a housing therefor, of a clutch member having fixed connection with the shaft, an operable clutch device anchored to the housing to co-act with the clutch member, a collar connected directly to one end of the clutch device to operate it and having a clutch face, and a sleeve on the shaft provided with a clutch face to co-act with said clutch face of the collar to actuate the same, the sleeve having connection with the shaft to be actuated thereby.

11. In anti-reverse mechanism, the combination, with a housing, a rotary transmission shaft, and a controlled gear wheel movable along the shaft, of a sleeve on and movable along the shaft to be rotated thereby and arranged to be moved by the gear wheel in inoperative direction, main clutching means to fasten the shaft to the housing upon reverse rotary movement of the shaft, controlling clutch means for the main clutching means actuated by the shaft, and manually operated means supported by the housing to move the sleeve in inoperative direction when the gear wheel is withdrawn from the sleeve.

12. In anti-reverse mechanism, the combination with a housing and a rotary transmission shaft therein, an annular clutch member fixed to the shaft, a sleeve capable of a limited longitudinal movement on said shaft and having a clutch element at one end, a collar rotatable on said sleeve and having a clutch element to coact with the like element on said sleeve, a clutch spring surrounding said collar and connected at one end thereto, the other end of said clutch spring being operatively connected to said housing, a compression spring engaged with said sleeve to normally impel it endwise in one direction, a controlled gear wheel movable on said shaft and including a part to engage the other end of the sleeve for retracting the same from clutching engagement with the collar, a manually operable bar supported in said housing and adapted to be moved into forcible engagement with said other end of said sleeve, when said part of said gear has been withdrawn therefrom, a spring to retract said bar and a latch operative to hold said bar in engagement with said other end of the sleeve.

13. In anti-reverse mechanism, the combination with a housing and a rotary transmission shaft therein, an annular clutch member fixed to the shaft, a sleeve capable of a limited longitudinal movement on said shaft and having a clutch element at one end, a collar rotatable on said sleeve and having a clutch element to coact with the like element on said sleeve, a clutch spring surrounding said collar and connected at one end thereto, the other end of said clutch spring being operatively connected to said housing, a compression spring engaged with said sleeve to normally impel it endwise in one direction, and screw action means actuated by said shaft upon initial reverse movement thereof to enable said sleeve to actuate said collar thereon following the impelling action of said compression spring.

14. An anti-reverse mechanism embodying therein an operable friction clutch device, a shaft, a member fixed to said shaft and adapted to be engaged by said clutch device for arresting the reverse movement of the shaft, a sleeve on said shaft operating in the reverse movement thereof to have a limited endwise movement in one direction thereon and a clutch actuating member surrounding the sleeve and operating in said movement of the sleeve upon such reverse movement of the shaft as to cause the clutch device to engage and hold said member fixed to said shaft.

15. An anti-reverse mechanism embodying therein an operable friction clutch device, a shaft, a member fixed to said shaft and adapted to be engaged by said clutch device for arresting the reverse movement of the shaft, a sleeve on said shaft, means providing a pin and inclined slot connection between said sleeve and shaft whereby in the reverse movement of said shaft, an endwise movement is imparted to said sleeve, and a clutch device actuating member surrounding said sleeve and operating in said endwise movement of the sleeve to cause the clutch device to engage and hold said member fixed to said shaft.

16. An anti-reverse mechanism embodying therein an operable friction clutch device, a shaft, a member fixed on said shaft, a sleeve on said shaft operating in the reverse movement of the shaft to have a limited endwise movement in one direction thereon, and a clutch device actuating member surrounding the sleeve and formed for a clutching engagement with said sleeve in the endwise movement thereof to cause the clutch device to engage and hold said member fixed to said shaft.

17. An anti-reverse mechanism embodying therein an operable friction clutch device, a shaft, a member fixed on said shaft and adapted to be engaged by said clutch device for arresting the reverse movement of the shaft, a gear element shiftable on said shaft, a sleeve on said shaft between said member and said gear and operating in the reverse movement thereof to have a limited endwise movement in one direction and a clutch device actuating member surrounding the sleeve and operating in the endwise movement thereof upon such reverse movement of the shaft as to cause the clutch device to engage and hold said member on the shaft, said gear element when shifted in one direction on said shaft, rendering the sleeve inoperative to operate said clutch device actuating member.

18. An anti-reverse mechanism embodying therein an operable friction clutch device, a shaft, a member fixed on said shaft and adapted to be engaged by said clutch device for arresting the reverse movement of the shaft, a gear element shiftable on said shaft, a sleeve on said shaft between said member and said gear, and operating in the reverse movement thereof to have a limited endwise movement in one direction and a clutch device actuating member surrounding said sleeve and both formed at one end with coacting clutch faces operative in an endwise movement of the sleeve to clutch said sleeve and clutch device actuating member together to cause the clutch device to engage and hold said member fixed to said shaft, said gear when shifted in one direction upon said shaft engaging the other end of the sleeve and rendering said sleeve inoperative to operate said clutch device actuating member.

19. An anti-reverse mechanism embodying therein, a stationary member, a shaft extending therethrough, a member fixed on said shaft and cooperating therewith to provide a clutch spring recess, a clutch spring in said recess for clutching both of said members together, a sleeve surrounding said shaft and operating to have a limited endwise movement upon reverse rotation of said shaft and a clutch spring actuating device surrounding said sleeve and operating in the endwise movement of the sleeve in one direction to energize said spring to clutch said member fixed on the shaft to said stationary member.

20. An anti-reverse mechanism embodying therein, a stationary member, a shaft extending therethrough, a member fixed on said shaft and cooperating therewith to provide a clutch spring recess, a clutch spring in said recess for clutching both of said members together, a sleeve surrounding said shaft and operating to have a limited endwise movement upon reverse rotation of said shaft and a clutch spring actuating device surrounding the sleeve and operating in the endwise movement of the sleeve in one direction to energize said spring to clutch said member fixed on said shaft to said stationary member and a gear shiftable endwise on said shaft, said gear when shifted in one direction forming a stop for said sleeve to render the same inoperative to operate said clutch spring operating device.

21. An anti-reverse mechanism embodying therein, a stationary member, a shaft extending therethrough, a member fixed on said shaft and cooperating therewith to provide a clutch spring recess, a clutch spring in said recess for clutching both of said members together, a sleeve surrounding said shaft and operating to have a limited endwise movement upon reverse rotation of said shaft, a clutch spring actuating device surrounding the sleeve and operating in the endwise movement of the sleeve in one direction to energize said spring to clutch said member fixed on said shaft to said stationary member and a member slidable in said stationary member in a plane at a right angle to said sleeve and operable to engage one end of the sleeve so as to render the same inoperative to operate said clutch spring operating device.

22. Anti-reverse mechanism having an operable clutch spring, a rotary drive shaft, a clutch member fixed to the shaft, and operable co-operating control sleeves carried on the shaft and provided with means to operate the clutch spring relatively to the clutch member, one of said sleeves having a head by which movement is imparted thereto for control of the sleeves.

In testimony whereof, I affix my signature on the 29th day of August, 1929.

WILLIAM CARLETON STARKEY.